United States Patent [19]

Murray et al.

[11] Patent Number: 5,412,038

[45] Date of Patent: May 2, 1995

[54] PROCESS UTILIZING ALKENYLCARBOXYLATE CROSSLINKERS

[75] Inventors: Rex E. Murray, Charleston, W. Va.; Robert F. Eaton, Belle Mead; Thomas A. Upshaw, Somerset, both of N.J.; James W. Taylor, Kingsport, Tenn.; David R. Bassett, Cary, N.C.; David M. Lincoln, Charleston, W. Va.

[73] Assignee: Union Carbide Chemicals & Plastics Technology Corporation, Danbury, Conn.

[21] Appl. No.: 83,659

[22] Filed: Jun. 28, 1993

[51] Int. Cl.[6] ............... C08F 265/04; C08F 291/08; C08L 33/06

[52] U.S. Cl. ................... 525/303; 525/223; 525/281; 525/304; 525/59; 525/284; 525/391; 525/445; 525/502; 525/302

[58] Field of Search ........... 525/223, 303, 304, 281, 525/59, 284, 391, 445, 502; 525/59, 284, 391, 445, 502

[56] References Cited

U.S. PATENT DOCUMENTS

| | | | |
|---|---|---|---|
| 3,843,390 | 10/1974 | Hudson et al. | 117/138.8 |
| 4,020,123 | 4/1977 | Trapasso | 260/837 |
| 4,732,960 | 3/1988 | Rasshofer et al. | 528/75 |
| 4,737,551 | 4/1988 | Dervan et al. | 525/440 |
| 4,758,475 | 7/1988 | Eckes et al. | 428/423.1 |
| 4,812,337 | 3/1989 | Sugimura et al. | 427/407.1 |
| 4,812,533 | 3/1989 | Simone et al. | 525/437 |
| 5,102,954 | 4/1992 | Baukeema et al. | 525/154 |

FOREIGN PATENT DOCUMENTS

0466409A1  7/1991  European Pat. Off. .

OTHER PUBLICATIONS

Stackman and Steinmann (Polym. Prepr., Amer. Chem. Soc., Div. Polym. Chem 9(1), 628 (1968); CA71:125036P.

*Primary Examiner*—Vasu S. Jagannathan
*Attorney, Agent, or Firm*—R. M. Allen

[57] ABSTRACT

A process for crosslinking a polymer containing hydroxyl groups which process comprises:

(a) forming a mixture of said polymer and crosslinking amount of a poly(alpha, beta-alkenylcarboxylate), and (b) maintaining the mixture at conditions under which the polymer cures by reaction of the hydroxyl groups of the polymer with the poly(alpha, beta-alkenylcarboxylate) to produce a crosslinked polymer.

7 Claims, 5 Drawing Sheets

PROCESS UTILIZING ALKENYLCARBOXYLATE CROSSLINKERS

BACKGROUND OF THE INVENTION

1. Field of the Invention

This invention relates to the use of poly(alpha,beta-alkenylcarboxylates), such as di-isopropenyl esters, to crosslink polymers containing hydroxyl groups.

2. Description of Related Art

Polymers containing hydroxyl groups (e.g., acrylic polymers) are typically crosslinked with melamine-formaldehyde resins (see, for example, U.S. Pat. Nos. 3,843,390; 4,737,551; and 4,812,533. However, formaldehyde (a possible carcinogen) can be produced as a byproduct of such crosslinking reactions and so efforts have been made to reduce such use of melamines (see U.S. Pat. No. 5,102,954).

Other polymers containing hydroxyl groups (e.g., polyether polyols) are typically crosslinked using polyisocyanates (see, for example, U.S. Pat. No. 4,732,960. However, polyisocyanates are relatively toxic materials. (see U.S. Pat. No. 4,758,475).

Still other polymers containing hydroxyl groups (e.g., certain styrene-acrylic emulsion polymers) are typically crosslinked using coalescing aids (e.g., isobutyraldehyde trimers such as Texanol®) along with crosslinking agents. Such coalescing aids represent an additional volatile component and their elimination would reduce the number of volatile components utilized in producing such crosslinked products (see published European Patent Application 0 466 409 A1).

U.S. Pat. No. 4,020,123 discloses the use polyisopropenyl esters to crosslink polymers containing amino groups but does not disclose the use of polyisopropenyl esters to crosslink acrylic polymers containing hydroxyl groups. Polymers containing amino groups are generally not readily available and are more expensive than hydroxyl-containing polymers.

Stackman and Steinmann (Polym. Prepr., Amer. Chem. Soc., Div. Polym. Chem 9(1), 628 (1968); CA71:125036P discloses the preparation of thermoplastic polyamides from di-isopropenyl esters and diamines. The preparation of thermoplastic polyesters from di-isopropenyl esters and ethylene glycol is also disclosed in this article. In particular, this article discloses that the reaction between di-isopropenyl adipate and ethylene glycol gave a thermoplastic, low molecular weight polyester polymer and the reaction between di-isopropenyl sebacate and ethylene glycol also gave a thermoplastic, low molecular polyester polymer. Hence, this article does not suggest the use of di-isopropenyl esters as crosslinkers, particularly as crosslinkers to produces higher molecular weight thermoset polymers.

Therefore, it is an object of the present invention to provide an improved process for crosslinking hydroxyl containing polymers.

It is a further object of the present invention to provide a process for crosslinking hydroxyl-containing polymers which does not require the use of polyisocyanate crosslinkers or volatile coalescing aids or involve the evolution of formaldehye as a byproduct.

Other objects of this invention will be apparent from the following description thereof.

SUMMARY OF THE INVENTION

This invention provides a process for crosslinking a polymer containing hydroxyl groups which process comprises:

(a) forming a mixture of said polymer and a crosslinking amount of a poly(alpha,beta-alkenylcarboxylate), and (b) maintaining the mixture at conditions under which the polymer cures by reaction of the hydroxyl groups of the polymer with the poly(alpha,beta-alkenylcarboxylate) to produce a crosslinked polymer.

DETAILED DESCRIPTION OF THE INVENTION

Figure 1:
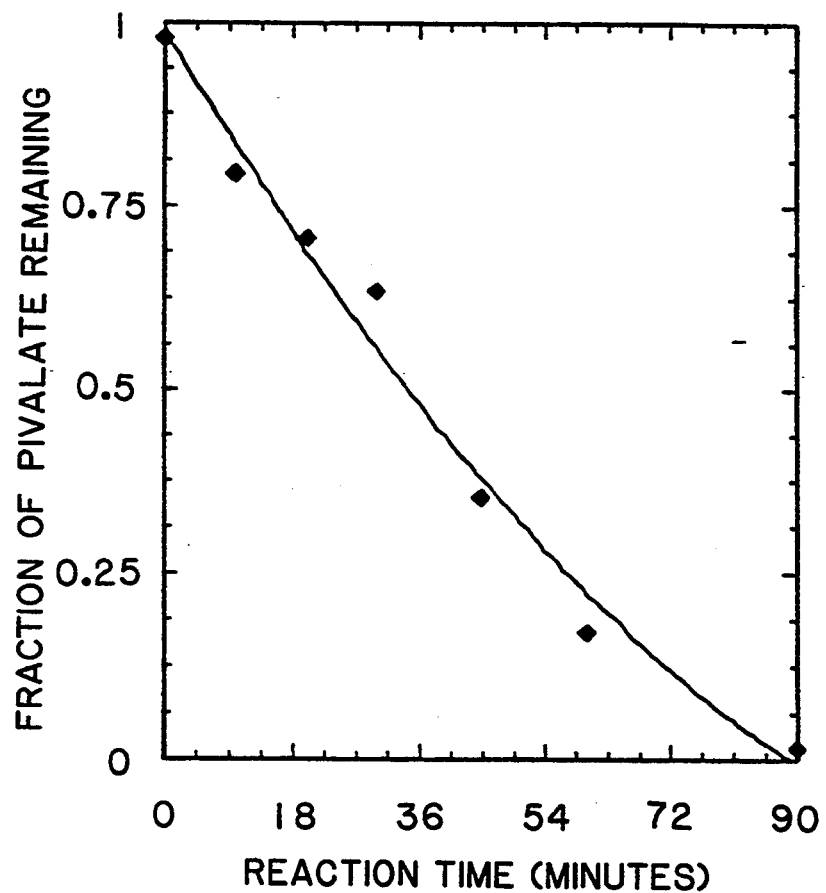
FIG. 1 shows the results of a kinetic study of the reaction between two model compounds (i.e., isopropenyl pivalate and 1-pentanol).

Any poly(alpha,beta-alkenylcarboxylate) can be employed in the process of the present invention. As used herein, the term "poly(alpha, beta-alkenylcarboxylate)" denotes any monomer or polymer containing at least two ester groups having the formula:

  (I)

wherein the

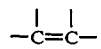

moiety is olefinic.

Illustrative of the groups represented by formula (I) above are groups hating the formulas:

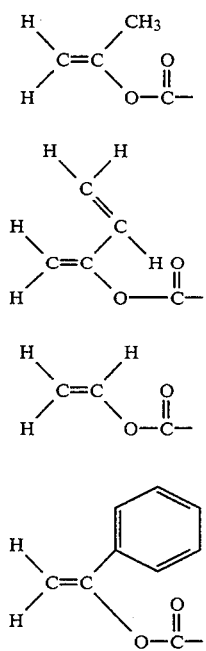

(II)

(IIIA)

(IIIB)

(IV)

A preferred class of poly(alpha,beta-alkenylcarboxylates) useful in the process of the present invention is represented by the formula:

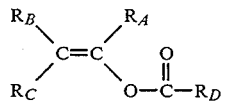

(V)

wherein $R_A$, $R_B$, $R_C$ and $R_D$ are hydrogen or an organic group, provided at least one of such groups contains a group represented by Formula (I) above. In Formula (V) above, $R_A$, $R_B$, $R_C$ and $R_D$ can be the same or different monomeric groups (e.g., alkyl groups) or polymeric groups {e.g., polyacrylate groups with pendant groups represented by formula (I) above}. Two or more of $R_A$, $R_B$, $R_C$ and $R_D$ can combined as a cyclic structure. Preferably, the crosslinker is free of isocyanato groups and groups that cause liberation of formaldehyde during the cure of the hydroxyl-containing polymer. The crosslinkers contain at least 2 and up to 10 or 40 or more alpha,beta-alkenylcarboxylate groups.

Illustrative of the monomeric poly(alpha,beta-alkenylcarboxylates) useful in the process of the present invention are the compounds represented by the formulas:

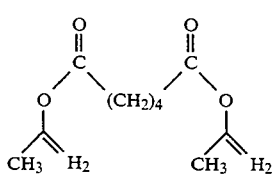

(di-isopropenyl adipate)

(VI)

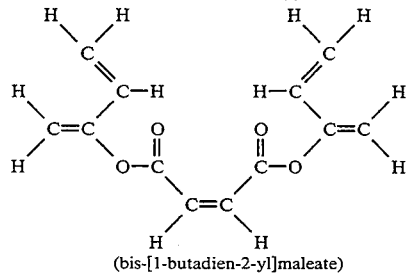

(bis-[1-butadien-2-yl]maleate)

(VII)

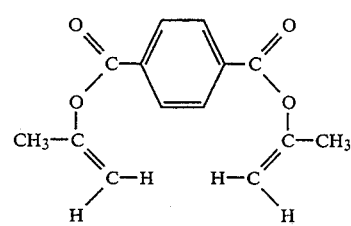

[diisopropenyl-(terephthalate)]

(VIII)

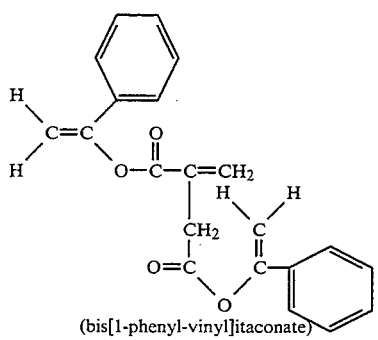

(bis[1-phenyl-vinyl]itaconate)

(IX)

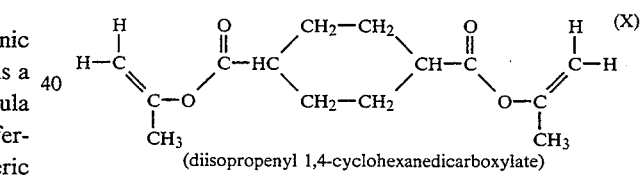

(diisopropenyl 1,4-cyclohexanedicarboxylate)

(X)

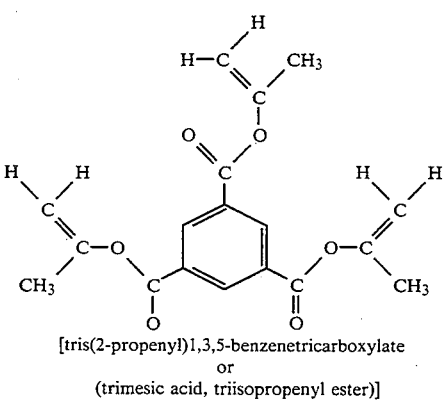

[tris(2-propenyl)1,3,5-benzenetricarboxylate
or
(trimesic acid, triisopropenyl ester)]

(XI)

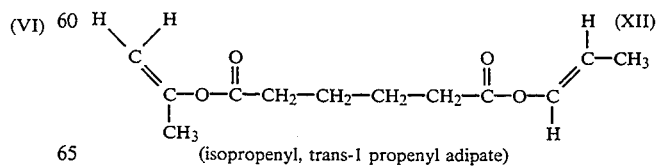

(isopropenyl, trans-1 propenyl adipate)

(XII)

One class of polymeric crosslinkers suitable for use in the process of the present invention are acrylic polymers having pendant groups represented by formula (I) above. Such polymers can be produced by homopolymerizing alpha, beta-alkenyacrylates or alpha, beta-alkenyl methacrylates or copolymerizing such monomers with one or more alkyl acrylates or alkyl methacrylates. Illustrative of such acrylic polymer crosslinkers are the following:

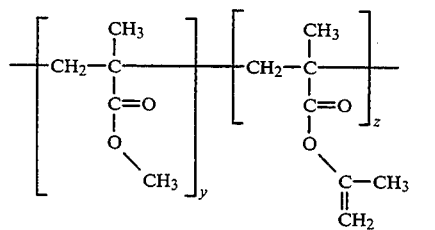

[poly(isopropenyl methacrylate-methyl methacrylate) were y and z are integers]

and

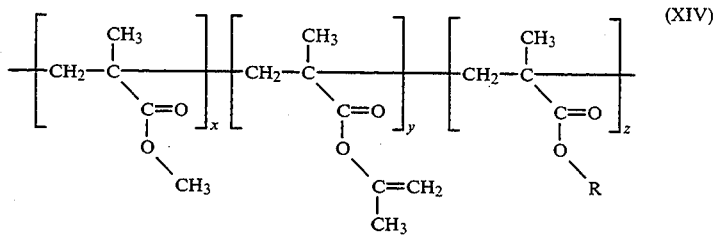

(a tripolar containing polymerized isopropenyl methacrylate where x, y and z are integers and R is an alkyl group having 3 to 6 carbon atoms).

Such acrylic polymer crosslinkers can crosslink hydroxyl-containing polymers according to the following illustrative equation:

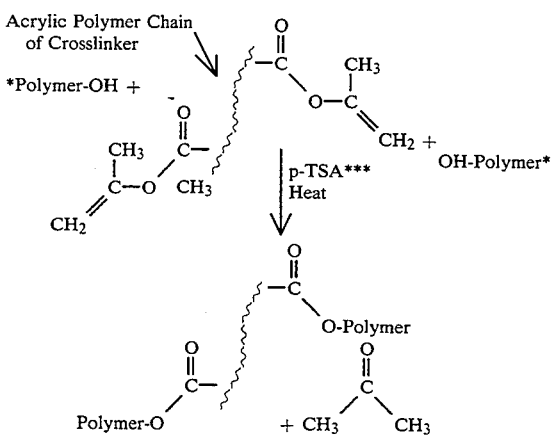

*for simplicity, only one of the hydroxyl groups of the polymer is shown
**para-toluene sulfonic acid catalyst The above-described acrylic polymers are novel compositions of matter that form a part of the present invention. Such acrylic polymer crosslinkers can be produced by group transfer polymerization. Group-transfer polymerization is a method for the controlled formation of polymers from $\alpha,\beta$-unsaturated carbonyl compounds, i.e. esters, ketones, carboxamides, and nitriles via a sequential conjugate (Michael type) addition process. The technique employs silyl ketene acetals as initiators and catalysts (e.g., certain fluorides) and is based on the known chemistry of the conjugate Michael addition of these silyl reagents to $\alpha,\beta$-unsaturated carbonyl compounds. This reaction involves the discovery of catalysts which promote the sequential conjugate addition of immediate silyl ketene acetals to $\alpha,\beta$-unsaturated carbonyl compounds, i.e. esters, ketones, carboxamides, or nitriles to form polymers {see Group-Transfer Polymerization. 1. A new concept for addition polymerization with organosilicon initiators) O. W. Webster, W. R. Hertler, D. Y. Sogah, W. B. Farnham, and T. V. RajanBabu, J. Am. Chem. Soc., 105, 5706 (1983)}. The process is termed group-transfer polymerization because it proceeds via transfer of the silyl group from the initiator and each intermediate ketene acetal to the unsaturated hetero atom (e.g., carbonyl oxygen of an ester) of the next monomer molecule to be added to the polymer chain. Thus, the chain ends of all the intermediate molecules are reactive, i.e., the polymers are "living", and the reaction continues until all the $\alpha,\beta$-unsaturated carbonyl is consumed or the polymerization is terminated by addition of a reagent (e.g., a protic solvent) which cleaves the silyl group from the polymer molecule.

The group-transfer polymerization process for producing the acrylic polymer crosslinkers useful in the present invention comprises forming a mixture of the appropriate monomer or monomers, initiator, catalyst and solvent and maintaining the mixture at an elevated temperature at which the acrylic polymer crosslinker forms. In this process, the olefinic double bonds in the acrylic moieties react but the olefinic double bonds in the alpha,beta-alkenyl moieties do not react. Suitable temperatures are from $-70°$ C. to $+20°$; a suitable initiator is methyl trimethyl silyl dimethyl ketene acetal; a suitable catalyst is tri(dimethyl amino) sulfur (trimethylsilyl) difluoride and a suitable solvent is tetrahydrofuran.

Another class of crosslinkers suitable for use in the process of the present invention are reaction products that can be produced by reacting melamine with excess of a poly(alpha,beta-alkenylcarboxylate) as illustrated by the equation:

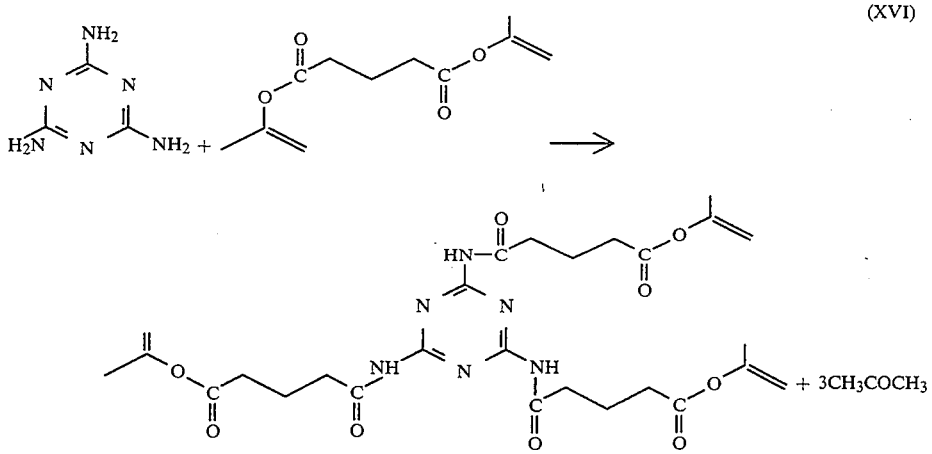

Also suitable for use as crosslinkers in the process of the present invention are cyclic poly(alpha, beta-alkenylcarboxylates). Illustrative of such carboxylates is the carboxylate having the formula:

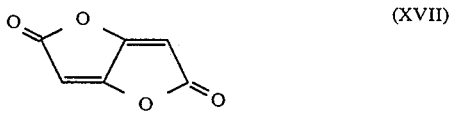

(XVII)

The carboxylate represented by formula (XVII) above can crosslink a hydroxyl-containing polymer (without the production of byproducts) by a reaction illustrated by the equation:

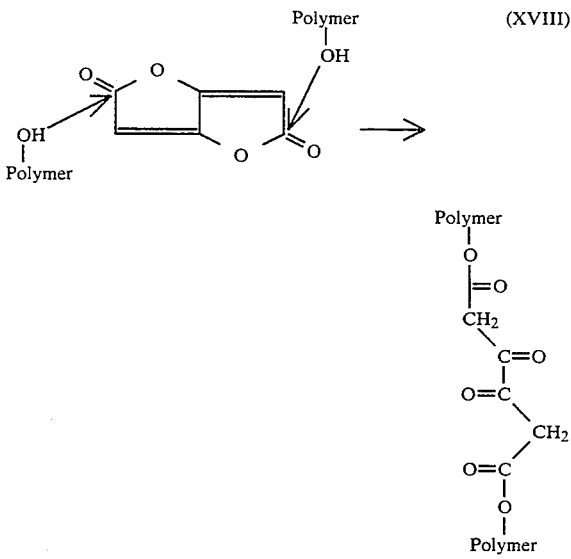

The hydroxyl-containing polymers that can be crosslinked in accordance with the process of the present invention contain at least 3, and preferably at least 6, hydroxyl groups per molecule. These polymers are illustrated by the following classes of polymers:

(a) Hydroxyalkyl acrylate modified vinyl chloride polymers such as the uniformly random hydroxyl-functional copolymers or terpolymers of; (i) vinyl chloride; (ii) hydroxyalkyl acrylate; and, optionally, (iii) a polymerizable monomer chosen from alkyl esters of polymerizable alpha, beta-ethylenically unsaturated acids such as acrylic, methacrylic, maleic, fumaric, itaconic and the like, and vinyl esters of saturated fatty acids, such as vinyl acetate, vinyl propionate, vinyl pivalate, vinyl 2-ethylhexanoate, vinyl neodecanoate and the like.

(b) Polyether polyol polymers such as the alkylene oxide adducts of water or a polyhydric organic compound as the initiator or starter, e.g., ethylene glycol; diethylene glycol; dipropylene glycol; trimethylene glycol; 1,2-cyclohexanediol; 3-cyclohexane-1,1-dimethanol and dibromo-derivative thereof; glycerol; 1,2,6-hexanetriol; 1,1,1-trimethyolethane; and 1,1,1-trimethyolpropane. Illustrative alkylene oxides include ethylene oxide, propylene oxide, butylene oxide as well as mixtures of such oxides. Also included among the polyether polyol polymers useful herein are poly(hydroxyethers) derived from diphenols and epichlorohydrin, e.g. phenoxy resins, as well as those polymers commonly referred to in the art as polymer/polyether polyols which may be produced by polymerizing one or more ethylenically unsaturated monomers dissolved or dispersed in any of the above described alkylene oxide adduct polyols. Illustrative of such unsaturated monomers which may be employed individually or in combination include ethylene, propylene, acrylonitrile, methacrylonitrile, vinyl chloride, vinylidene chloride, styrene, alpha-methylstyrene, butadiene, and the like.

(c) Polyhydroxy-containing acrylic polymers and styrene-acrylic polymers such as the copolymers and terpolymers of hydroxyalkyl acrylates having 2 to 4 carbon atoms in the alkyl groups and alkyl acrylates and/or alkyl methacrylates having 1 to 6 carbon atoms in the alkyl groups.

(d) Polyvinyl alcohol polymers such as the hydrolyzed or partially hydrolyzed polymers derived from the homopolymers of vinyl esters of saturated fatty adds or the copolymers of said vinyl esters and one or more ethylenically unsaturated monomers such as ethylene, propylene, butylene, acrylonitrile, methacrylonitrile, vinyl chloride, vinylidene chloride, styrene, alpha-methylstyrene, butadiene, and the like.

(e) Polyhydroxy containing polyvinyl acetal polymers such as polyvinylbutyral resins and the like.

(f) Polyester polyol polymers such as the reaction products of polyfunctional organic carboxylic acids and polyhydric alcohols, which reaction products contain at least two hydroxyl groups (as alcoholic OH) per molecule, and cyclic ester polymers containing at least two hydroxyl groups per molecule prepared from epsilon caprolactone or other lactones and the copolymers of such lactones with polyhdric alcohols. Typical of the polyfunctional organic carboxylic acids that can be employed in producing polyester polyols useful in this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. The polyhydric alcohols (organic polyols) that can be employed in producing the polyester polyol starting material useful in this invention include the monomeric polyhydric alcohols such as, for example, glycerol; 1,2,6-hexanetriol; ethylene glycol; diethylene glycol; trimethylol propane; trimethyolethane; pentaerythritol; propylene glycol; 1,2-, 1,3- and 1,4-butylene glycols; 1,5-pentanediol; sorbitol; and the like, including mixtures thereof.

(g) Phenolic resin polymers such as the solid resoles and novolak resins. The phenol of the resin can be unsubstituted phenol or substituted such as cresol, bisphenol-A, para-substituted phenols and the like while formaldehyde or a material that generates formaldehyde in situ is the aldehyde employed in making phenol resins. The preferred phenolic resins are resoles produced by reacting formaldehyde with bis-phenol-A at elevated temperatures in the presence of a base-catalyst and having a neutralized pH of about 3 to 8.

The process of the present invention is preferably conducted in a low molecular weight solvent. Suitable solvents are ketones, ethers, esters and other aprotic liquid and, particularly where emulsion polymers are being crosslinked, water. Preferably, the solvent is not a compound containing a single active hydrogen atom (e.g., alkanols). Suitable solvents include tetrahydrofuran, methyl ethyl ketone and butanone. The process of the present invention is preferably conducted in the presence of a catalyst for the crosslinking reaction. Suitable catalysts include acidic and basic compounds such as p-toluenesulfonic acid, phosphoric acid, potassium carbonate, sulfuric acid and trifluoromethanesulfonic acid. A preferred class of catalysts are amineblocked sulfonic acid catalysts which unblock to catalyze the crosslinking reaction at elevated temperatures. Such blocked sulfonic acid catalysts include as Resin Catalyst FC-520 (an amine-blocked trifluoromethanesulfonic acid catalyst from Minnesota Mining and Manufacturing Company) and Nacure 2500 TM (an amineblocked toluenesulfonic acid catalyst from King Industries Inc.). The relative amount of the starting materials used in the process of this invention is not narrowly critical. The relative amount of crosslinker and hydroxyl-containing polymer will be determined by the stoichiometry of the crosslinking reaction according to well known principles. Similarly, a catalytic amount of the catalyst is employed. The process of the present invention is preferably conducted at an elevated temperature to accelerate the crosslinking reaction.

In the curing reaction involved in the process of the present invention, an aldehyde or a ketone is usually formed as by-product [except when a cyclic crosslinker, such as represented by formula (XVII) above, is used]. An aldehyde is the by-product when the alpha carbon atom of the alkenyl group in the poly(alpha,beta-alkenylcarboxylate) is attached to a hydrogen atom and a ketone in the by-product when the alpha carbon atom is attached to an organic group. These aldehydes and ketones are essentially non-reactive with the crosslinked polymer that is formed as the principal product. By way of contrast, when a polymer containing hydroxyl group is crosslinked with melamine-formaldehyde resin, formaldehyde is produced as a by-product which can react with the crosslinked polymer to a significant extent. That is, the crosslinking reaction involving poly(alpha,beta-alkenylcarboxylates) is essentially irreversible. As a result, poly(alpha,beta-alkenylcarboxylates) provide significantly more complete crosslinking of the polymers than is sometimes achieved with melamine-formaldehyde resins.

Another aspect of the present invention is a process for producing polymers which comprises reacting a polymer containing groups represented by Formula (I) above with a monomeric compound (e.g., an amine or a polyol) containing a plurality of active hydrogen atoms. Suitable monomeric polyols include propanediol, ethylene glycol, butane diol, and hexane diol. In general, this process can be conducted in the same manner as the process described above involving hydroxyl-containing polymer reactants.

In the Examples appearing below, the solvent resistance of a polymeric film is used as a index of the degree of crosslinking of the polymer, solvent resistance was evaluated by the "MEK Rub" test where a cotton cheese cloth is saturated with methyl ethyl ketone (MEK) and rubbed with hand pressure on the coating until coating failure occurs. A complete forward and reverse motion constitutes one rub. The number of rubs to failure is reported. Failure occurs when the surface being rubbed becomes exposed. A higher number of rubs indicates more complete crosslinking. A value of 200 or more indicates very good crosslinking.

Yet another aspect of the present invention is a process for producing polymers which comprises reacting a polymer containing groups represented by formula (I) above with a dialkeny dicarboxylate. This process can be conducted at elevated temperatures and in the presence of a peroxide catalyst (e.g., t-butyl pereroxy-benzoate).

The polymers produced by the process of the present invention are useful in the same applications as known crosslinked polymers containing hydroxyl groups. By way of illustration, the crosslinked polymers are useful as coatings for metals, wood and plastics.

The products of the process of the present invention are thermoset polymers. One measure of the crosslinking efficiency of a thermoset polymer is gel fraction (usually denoted as "X100"). (See Chemistry and Properties of Crosslinked Polymers, Labana, Academic Press, 1977, page 347). Gel fraction is defined as the fraction of insoluble polymer produced during a crosslinking process, and is a measure of crosslinking efficiency. This measurement has been used to quantify the amount of crosslinking in the Examples shown below which illustrate the process of the present invention. An XI00 value of 90 or more indicates a very good level of crosslinking. As shown in Example 2 below, crosslinked coatings with high gel contents can be obtained from hydroxyl-containing polymers using small amounts of di-isopropenyl adipate under mild condition.

The following Examples illustrate the present invention:

EXAMPLE 1

Kinetic Study of the Reaction Between Isopropenyl Pivalate and 1-Pentanol in Toluene The isopropenyl pivalate used in the following study had the formula:

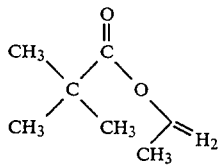

Although isopropenyl pivalate is not a poly(alpha, beta-alkenylcarboxylate) and 1-pentanol is not a hydroxyl-containing polymer, they are useful model compounds for the following kinetic study which is also relevant to the reactivity of poly(alpha, beta-alkenylcarboxylates) and hydroxyl-containing polymers.

To a 100 milliliter volumetric flask were charged 14.81 grams of isopropenyl pivalate, 8.90 grams of 1-pentanol and 0.02 grams of 2,6-di-tert-butyl-4methylphenol. The reactants were diluted to the mark with toluene. An infrared spectrum was obtained of the above solution (density, 0.859 grams per milliliter at 23° C.). To a 200 milliliter round-bottomed flask equipped with a condenser, stirrer, thermometer and nitrogen inlet were charged 85.0 grams of the above solution. The reactants were heated to 80° C. and then 0.32 grams of p-toluene sulfonic add added as a catalyst. Samples were taken at regular interval, and analyzed by infrared spectroscopy. The disappearance of the carbonyl absorbance at 1745 cm$^{-1}$ were observed to appear. The carbonyl absorption at 1716 cm$^{-1}$ was identified as the carbonyl absorption from acetone. The absorption at 1725 cm$^{-1}$ represented the formation of the ester of pivalic add and 1-pentanol. In addition, the disappearance of the absorbance at 1674 cm$^{-1}$, which represents the unsaturation in the isopropenyl moiety, was used to monitor the reaction between isopropenyl pivalate and 1-pentanol. In addition, the disappearance of the absorbance at 1674 cm$^{-1}$, which represents the unsaturation in the isopropenyl moiety, was used to monitor the reaction between isopropenyl pivalate and 1-pentanol. The results are shown in FIG. 1. These results indicate that the reaction occurs rapidly and completely at relatively low temperatures.

EXAMPLE 2

Preparation of an Acrylic Polymer Containing 25% Hydroxyethyl Methacrylate in PM Acetate To a round-bottomed flask equipped with a stirrer, nitrogen purge, and condenser were charged 151.20 grams of PM Acetate, 78.72 grams of methyl methacrylate, 44.28 grams of n-butyl acrylate and 41.00 grams of hydroxyethyl methacrylate. The contents of the reactor were brought up to 80° C., then 8.0 grams of 2,2-azobis(2,4-dimethyl valeronitrile) catalyst dissolved in 60.7 grams of PM Acetate* were added via a dropping funnel over 15 minutes. The contents of the flask were maintained at 80° C. for 6 hours and then were cooled. The acrylic polymer solution so produced had a solids content of 47.3 weight percent. The molecular weight of the acrylic polymer was 6,674 g/mole (Mn) and 14,971 g/mole (Mw).

*PM Acetate is a mixture of the following isomers:

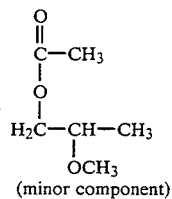

(minor component)

and

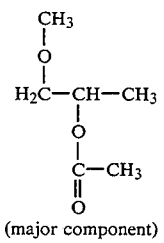

(major component)

EXAMPLE 3

Figure 2:
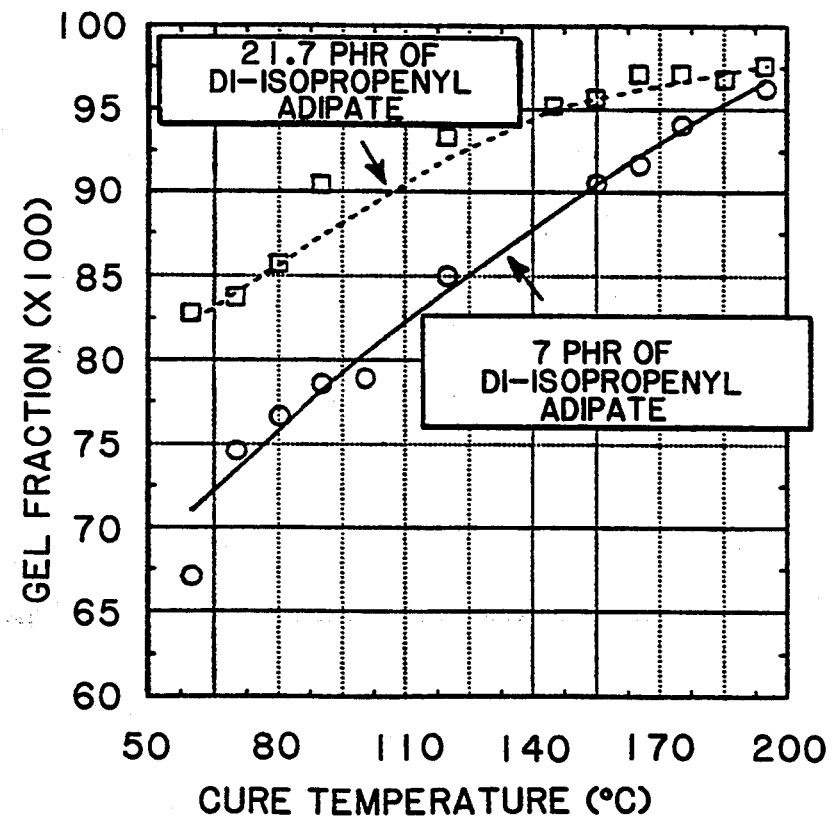
FIG. 2 shows the results of crosslinking studies with di-isopropenyl adipate and a hydroxyl-containing polymer.
Figure 3:
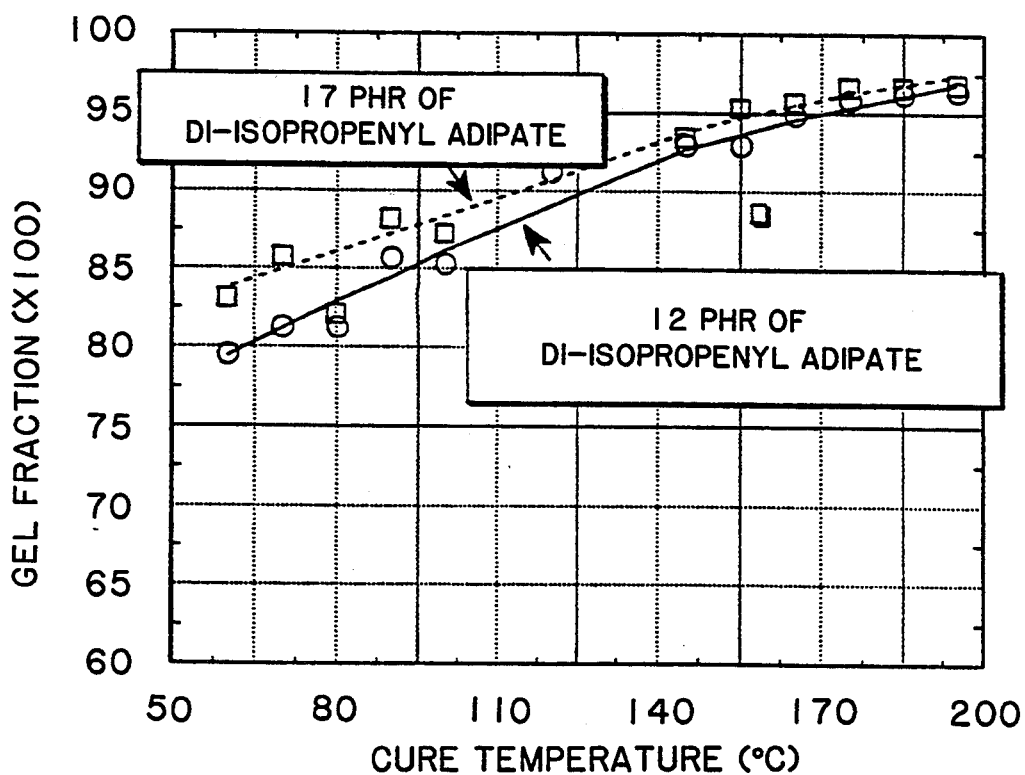
FIG. 3 shows the results of crosslinking studies of di-isopropenyl adipate and a hydroxyl-containing polymer.
Figure 4:
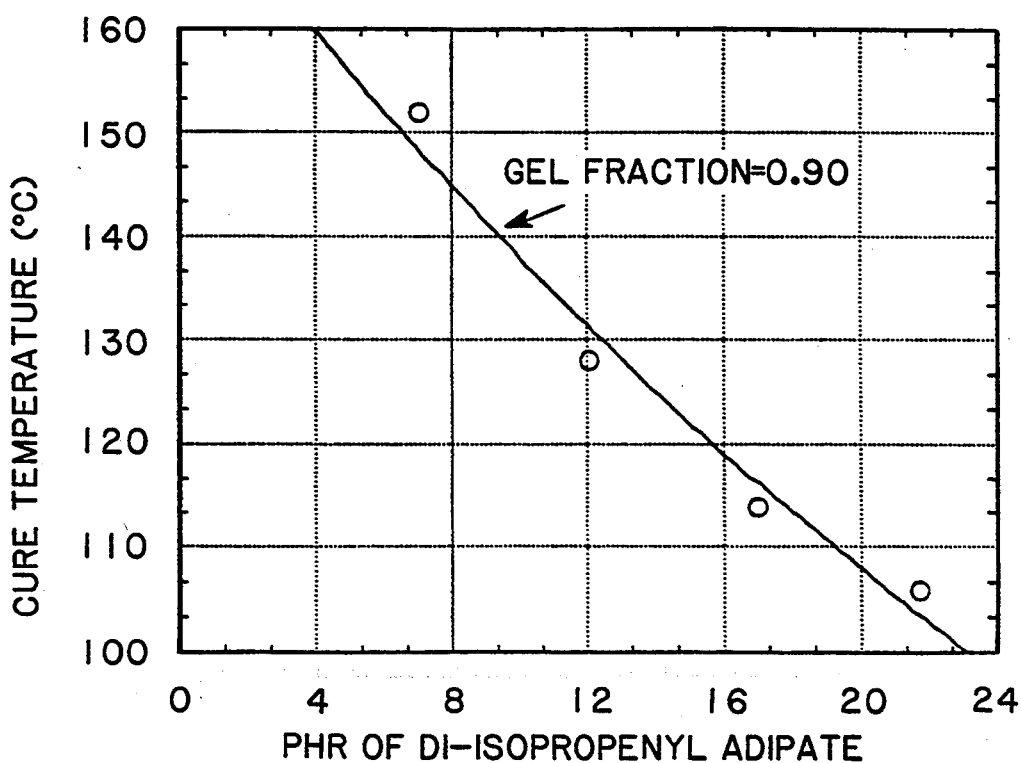
FIG. 4 is a plot of cure temperature of a hydroxyl-containing polymer as a function of the level of di-isopropenyl adipate crosslinker.

Evaluation of the Di-isopropenyl Adipate with the Polymer from Example 2 Using Tetrahydrofuran as the Solvent Formulations were prepared by adding 2.11 grams of the polymer solution from Example 2 to 8.0 grams of tetrahydrofuran (THF). To each solvent-borne formulation was added di-isopropenyl adipate and 3 parts per hundred of para-toluene sulfonic acid (based on the polymer). The samples were cured in aluminum pans for 30 minutes in a forced-air oven. After the films were cured, 50 milligram samples were removed from the pans and were extracted for 18 hours using tetrahydrofuran. The extracted films were dried at 100° C. for one hour, then the gel fraction (X100) calculated. The results are shown in the FIGS. 2, 3 and 4 which indicate a good degree of crosslinking at relatively low temperatures.

EXAMPLE 4

Figure 5:
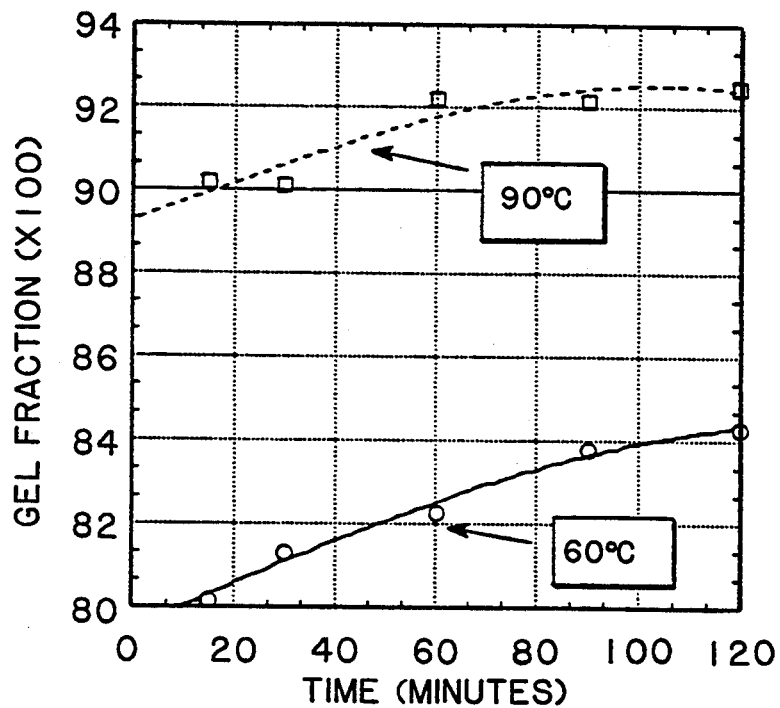
FIG. 5 shows the gel fraction of the crosslinked hydroxyl-containing polymer of Example 2 using di-isopropenyl adipate as the crosslinker.

Evaluation of the Di-isopropenyl Adipate with a Polymer Formulation Using in Methyl Ethyl Ketone as the Solvent Ten grams of the polymer solution produced as described in Example 2 above was vacuum dried overnight at 90° C. and was then heated for 2 hours at 140° C. to remove the PM Acetate. The dried polymer was redissolved in methyl ethyl ketone (MEK) and the solids of the resulting polymer solution were 50 weight percent. Formulations were prepared by adding 4.0 grams of the methyl ethyl ketone polymer solution to an additional 16.0 grams of methyl ethyl ketone. To each solvent-borne formulation so produced was added 0.434 grams of di-isopropenyl adipate and 3 parts per hundred of para-toluene sulfonic acid as a catalyst (based on the weight of the polymer). The samples were cured in aluminum pans for various lengths of time at 60° C. and 90° C. in a forced-air oven. After the films were cured, 50 milligram samples of the films were removed from the pans and were extracted for 18 hours using tetrahydrofuran. The extracted films were dried at 110° C. for one hour and then the gel fraction (X100) of the films calculated. The results are shown in the FIG. 5 which indicate faster cure at 90° C.

EXAMPLE 5

Preparation of an Acrylic Polymer Containing 10% Hydroxyethyl Methacrylate Using PM Acetate as the Solvent To a round-bottomed flask equipped with a stirrer, nitrogen purge and condenser were charged 151.20 grams of PM Acetate, 177.06 grams of methyl methacrylate, 31.21 grams of n-butyl acrylate and 16.49 grams of hydroxyethyl methacrylate. The contents of the reactor were brought up to 80° C. and then 8.0 grams of 2,2-azobis(2,4-dimethylvaleronitrile) catalyst dissolved in 60.7 grams of PM Acetate were added via a dropping funnel over 14 minutes. The reaction was maintained at 80° C. for 7 hours and then cooled. The acrylic polymer solution so produced had a solids content of 46.3 weight percent. The molecular weight of the polymer was 9,294 g/mole (Mn) and 18,241 g/mole (Mw).

EXAMPLE 6

Evaluation of Di-isopropenyl Adipate with a Blocked Catalyst

The composition of the hydroxy-containing acrylic polymer (Polymer AA) that was used in this Example was:

|  | wt % | grams |
|---|---|---|
| n-butyl acetate | 40.4 | 199.61 |
| methyl methacrylate (MMA) | 21.2 | 104.36 |
| butyl acrylate (BA) | 13.9 | 68.34 |
| hydroxyethyl methacrylate (HEMA) | 12.8 | 62.92 |
| styrene | 11.8 | 58.58 |

Polymer AA had a number average molecular weight ($M_n$) of about 8,700, and an equivalent weight of about 600 and about 14.5 hydroxyls per molecule.

Films were laid down on Bonderite-treated steel panels using Polymer AA, diisopropenyl adipate (DIPA) and Nacure 2500 ™ (sold by King Industries Inc.) (an amine-blocked aromatic sulphonic acid catalyst in isopropanol). The molar stoichiometry was calculated to be 1:1 based on hydroxyl number titration of the acrylic polymer.

Five sets of films were made and tested.

A. The first set was formulated using 20.02 grams of polymers, 2.23 grams of DIPA, 0.39 gram of Nacure 2500 ™ (sold by King Industries Inc. and 45 drops of butyl acetate. With this mixture, films were laid down using a size 30 drawdown bar. The panels were cured in an oven at 120° C. at intervals of 4 hours, 8 hours, and 1 day and then tested for MEK rubs (Table 1, Part A). MEK resistance (double rubs) for all three panels was greater than 400 and the panels had changed colour from clear to light yellow.

B. The second set of panels was a repetition of the first set, except that the curing temperature was 100° C.

C. The third set was also a repetition of the first set, except that the curing temperature was 90° C. At these temperatures, panels were also tested after curing for 4 hours, 8 hours and 1 day. The panels cured at 100° C. showed good solvent resistance only after more than 8 hours (Table 1, part B), and the panels cured at 90° C. did not give any solvent resistance even after 24 hours. (Table 3, part C).

D. Drawdowns were made again using the same composition as above. This time only one panel was tested. The curing temperature was increased in increments of 5° C. from 120° C. to 150° C. The panel was tested for MEK resistance at 15 minute cure intervals (Table 2, part A). At 150° C., MEK rubs were greater than 200 which told us that there was significant crosslinking.

E. Another set of drawdowns was done to determine the temperature at which the catalyst would deblock to give a 15-minute cure time. Panels were cured at 145° C. and 150° C. for 15 minutes (Table 2, part B). It was found that at 145° C. cure, significant MEK resistance was seen and at 150° C. cure, crosslinking was essentially complete.

TABLE 1

| Panel | Bake time | Bake temp (°C.) | MEK Rubs |
|---|---|---|---|
| PART A | | | |
| 1 | 4 hours | 120 | >400 |
| 2 | 8 hours | 120 | >400 |
| 3 | 1 day | 120 | >400 |
| PART B | | | |
| 1 | 4 hours | 100 | 108 |
| 2 | 8 hours | 100 | 156 |
| 3 | 1 day | 100 | >400 |
| PART C | | | |
| 1 | 4 hours | 90 | 26 |
| 2 | 8 hours | 90 | 24 |
| 3 | 1 day | 90 | 11 |

Long Cure Times

TABLE 2

Rapid Cure Times

PART A - Cumulative Conditions

| Panel | Time (min)* | Cure Temp (°C.)* | MEK Rubs |
|---|---|---|---|
| 1 | 15 | 120 | 13 |
| | 30 | 125 | 11 |
| | 45 | 130 | 17 |
| | 60 | 140 | 50 |
| | 75 | 145 | 140 |
| | 90 | 150 | >200 |

*cumulative exposure

PART B - Fifteen Minute Cure

| Panel | Time (min) | Cure Temp (°C.) | MEK Rubs |
|---|---|---|---|
| 1 | 15 | 145 | 136 |
| 2 | 15 | 150 | 341 |

EXAMPLE 7

Evaluation of Di-isopropenyl Adipate Using Another Blocked Catalyst

Example 6 above was repeated using a less effective catalyst (i.e., FC-520), the results are shown in Tables 3 and 4.

TABLE 3

INITIAL CURE TEST

| Panel | Time* | Temp (°C.) | MEK Rubs | Colour |
|---|---|---|---|---|
| 1 | 4 hrs | 120 | 13 | clear |
| 2 | 1 day | 120 | 96 | clear |
| 3 | 2 days | 140 | >400 | yellow |
| 4 | 3 days | 140 | >400 | yellow |

*time and temperatures are cumulative

TABLE 4

PART A - AMBIENT CURE TESTS

| Panel | Time | Temp (°C.) | MEK Rubs |
|---|---|---|---|

TABLE 4-continued

| | | | |
|---|---|---|---|
| 1 | 1 hr | 85 | 84 |
| 2 | 17 hr | 85 | 41 |
| 3 | 17 hr | 85 | 66 |
| 4 | 17.75 hrs | 85 | 60 |
| 5 | 1 day | 85 | 56 |
| 6 | 1 day | ambient | 26 |
| 7 | 2 days | ambient | 42 |

PART B - TOUCH DRY TESTS

| Panel | Time | Temp (°C.) | Touch-Dry* |
|---|---|---|---|
| 1 | 2 hrs | ambient | yes |
| 2 | 15 min | 85 | no |
| 3 | 30 min | 85 | no |
| 4 | 45 min | 85 | yes |
| 5 | 1 hr | 85 | yes |
| 6 | 1 day | 85 | yes |
| 7 | 1 day | ambient | yes |

*This is a qualitative cure test based on whether or not the film is wet to the touch (uncured) or dry to the touch (at least partially cured).

EXAMPLE 8

Preparation of an Acrylic Polymer Containing 25% Hydroxyethyl Methacrylate in PM Acetate To a round-bottomed flask equipped with a stirrer, nitrogen purge, and condenser were charged 151.20 grams of PM Acetate, 78.7 grams of methyl methacrylate, 44.8 grams of n-butyl acrylate and 41.00 grams of hydroxyethyl methacrylate. The contents of the flask were brought up to 80° C. and then 8.0 grams of 2,2-azobis(2,4-dimethyl valeronitrile) dissolved in 60.7 grams of PM Acetate were added via a dropping funnel over 15 minutes. The contents of the flask were maintained at 80° C. for 6 hours and then were cooled to produce a polymer solution containing 47.3 weight percent solids. The molecular weight of the polymer was: 6,674 grams/mole (Mn) and 14,871 grams/mole (Mw).

EXAMPLE 9

Preparation of an Acrylic Polymer Containing 25% Hydroxyethyl Methacrylate in 2-Butanone To a round-bottomed flask equipped with a stirrer, nitrogen purge, and condenser were charged 390.6 grams of PM Acetate, 203.36 grams of methyl methacrylate, 114.39 grams of n-butyl acrylate and 105.92 grams of hydroxyethyl methacrylate. The contents of the flask were brought up to 80° C. and then 44.72 grams of 2,2-azobis(2,4-dimethylvaleronitrile) dissolved in 141.01 grams of PM Acetate were added via a dropping funnel over 15 minutes. The contents of the flask were maintained at 80° C. for 7 hours and then were cooled to produce a solution containing 50.8 weight percent polymer. The polymer had a molecular weight of 4,618 grams/mole ((Mn) and 13,399 grams/mole (Mw). One hundred grams of the polymer solution so obtained were dried in a vacuum oven overnight at 100° C. The next morning the polymer was then dried at 140° C. for 2 hours. Fifty-one grams of dried polymer were obtained. This polymer was then dissolved in 2-butanone to form a solution containing 50.0 weight percent solids.

EXAMPLE 10

Preparation of a Poly(isopropenyl methacrylate) Crosslinker from a Monomer Solution of 25% Methyl Methacrylate and 75% Isopropenyl Methacrylate To a dried round-bottomed flask equipped with a stirrer, nitrogen purge, and condenser were charged 53 grams of tetrahydrofuran solvent, 9.43 grams of methyl trimethyl silyl dimethyl ketene acetal as an initiator and 0.75 milliliters of catalyst [0.1M of tri(dimethylamino) sulfur (trimethylsilyl) difluoride in acetonitrile]. The contents of the flask were cooled to 2° C. and then a monomer solution composed of 12.5 grams of methyl methacrylate and 37.5 grams of isopropenyl methacrylate was fed into the flask over 1 hour and 20 minutes while maintaining the temperature below 4° C. The contents of the flask were stirred overnight at room temperature. Two grams of methanol to terminate the reaction and 0.011 grams of 2,6-di-tert-butyl-4-methylphenol to inhibit the polymerization of the isopropenyl groups were added to the flask to form a polymer solution containing 51 weight percent solids. The polymer was precipitated in water and then vacuum dried overnight at 60° C. and 2 millimeters of mercury pressure. The molecular weight of the resulting polymer was: Mn, 1,176 and Mw, 1,709.

EXAMPLE 11

Evaluation of the Poly(isopropenyl methacrylate) Crosslinker from Example 10 with the Polymer from Example 9

Figure 7:
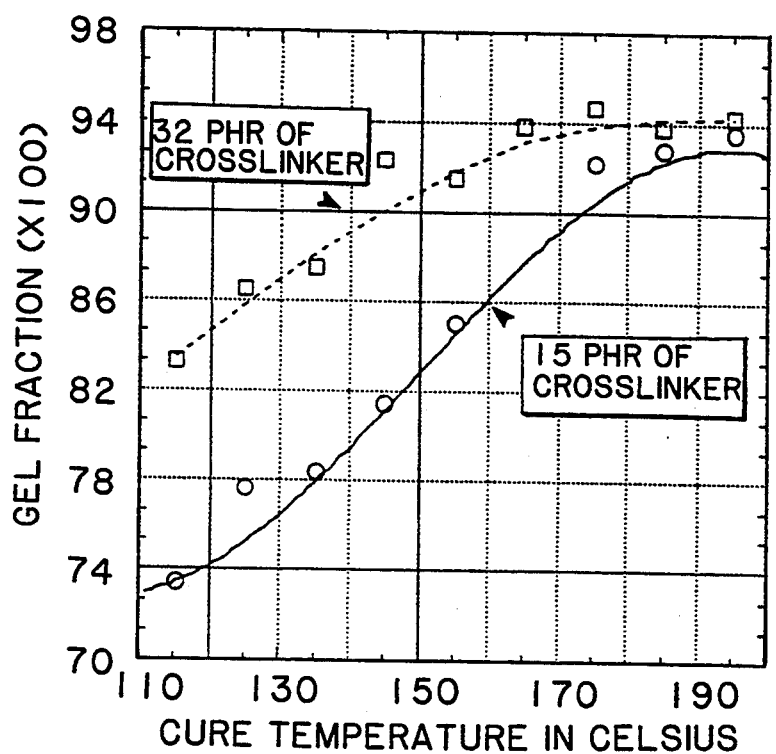
FIG. 7 shows crosslinking studies of the crosslinker of Example 10 below.
Figure 8:
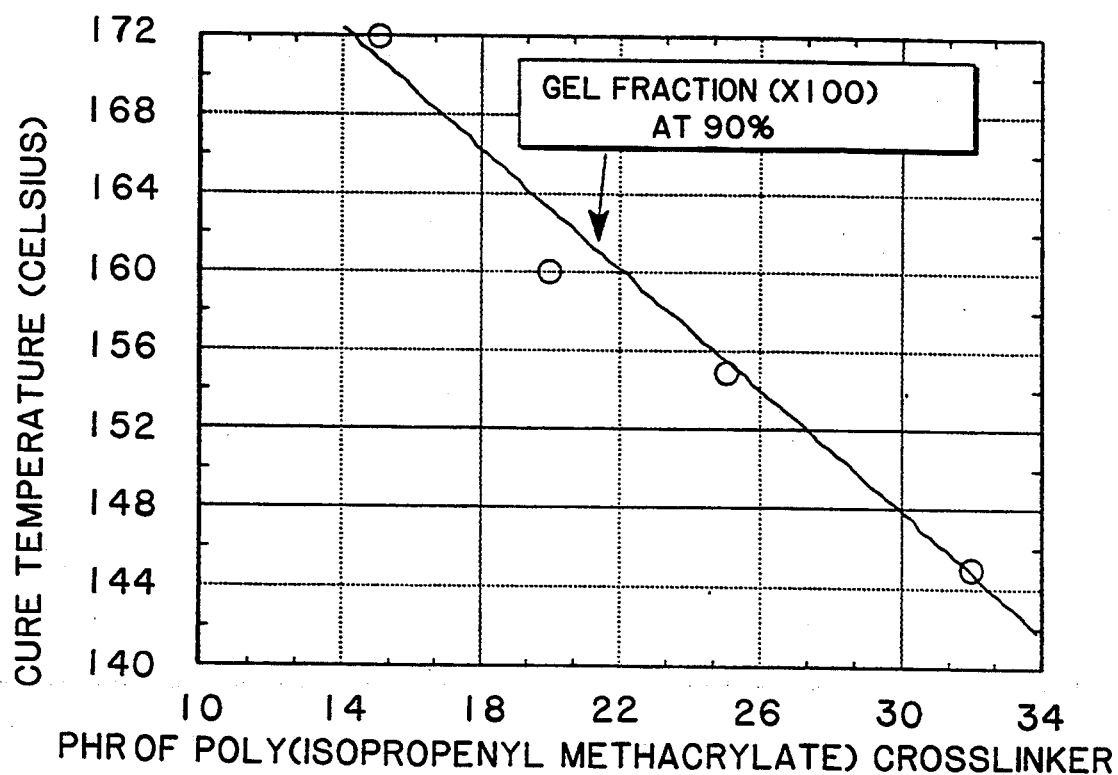
FIG. 8 shows a contour plot of gel fraction as a function of cure temperature and crosslinker concentration of for samples cured in Example 10 below.

Formulations were prepared by adding 2.11 grams of the polymer solution from Example 8 above to 8.0 grams of tetrahydrofuran. To each solvent-borne formulation was added dried crosslinker from Example 10 above and 3 parts per hundred of para-toluene sulfonic acid. The samples were cured in aluminum pans for 30 minutes in a forced-air oven. After the films were cured, 50 milligram samples of the films were removed from the pans and were extracted for 18 hours using tetrahydrofuran. The extracted films were dried at 110° C. for one hour and then the gel fraction (X100) calculated. The results are shown in the FIGS. 7 and 8.

EXAMPLE 12

Evaluation of the Poly(isopropenyl methacrylate) Crosslinker from Example 10 with the Polymer from Example 9

Figure 9:
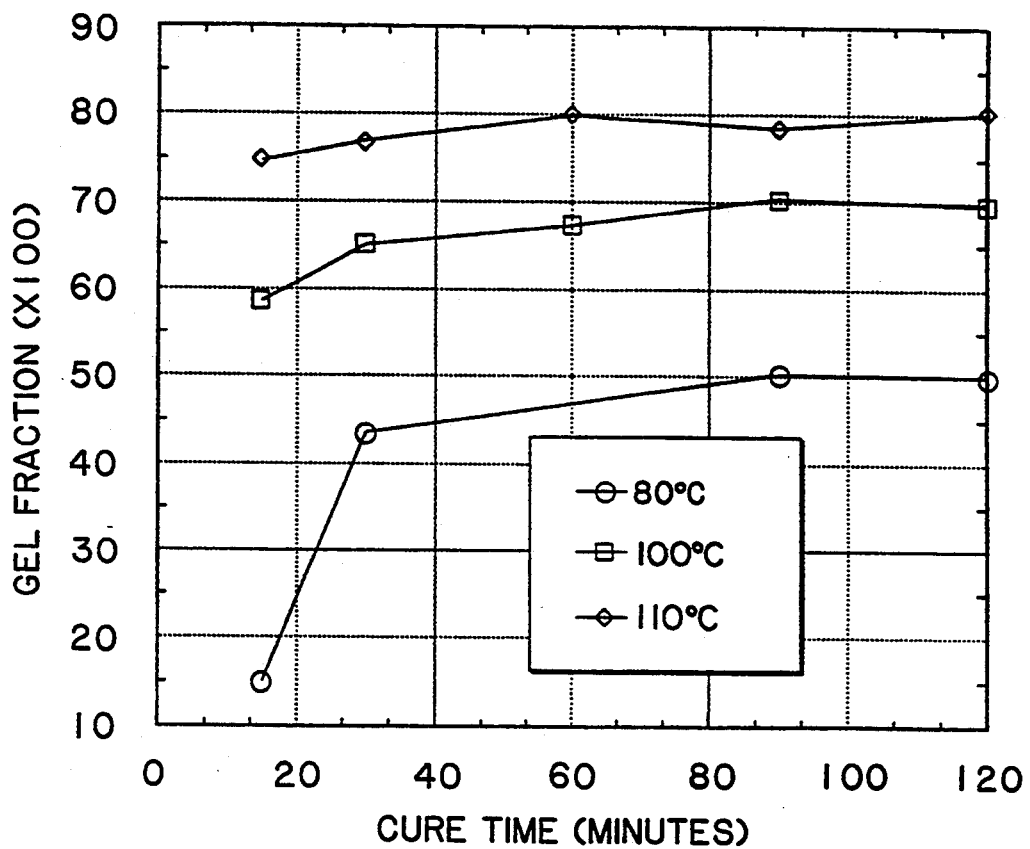
FIG. 9 shows gel fraction versus cure time for samples cured in Example 12 below.

Formulations were prepared by adding 2.00 grams of the polymer solution from Example 5 to 8.0 grams of 2-butanone. To each solvent-borne formulation was added dried crosslinker from Example 10 and 3 parts per hundred of para-toluene sulfonic acid. The samples were cured in aluminum pans for 30 minutes in a forced-air oven. After the films were cured, 50 milligram samples of the films were removed from the pans and were extracted for 18 hours using tetrahydrofuran. The extracted films were dried at 110° C. for one hour and then the gel fraction (X100) was calculated. The results are shown in the FIG. 9.

EXAMPLE 13

Preparation of an Acrylic Polymer Containing 10% Hydroxyethyl Methacrylate in PM Acetate To a round-bottomed flask equpped with a stirrer, nitrogen purge and condenser were charged 151.20 grams of PM Acetate, 177.06 grams of methyl methacrylate, 31.32 grams of n-butyl acrylate and 16.49 grams of hydroxyethyl methacrylate. The contents of the flask were brough up to 80° C., then 8.0 grams of 2,2-azobis(2,4-dimethylvaleronitrile) dissolved in 60.7 grams of PM Acetate were added via a dropping funnel over 14 minutes. The reaction was maintained at 80° C.

for 7 hours and cooled. The following product solids content was 46.3% and contained a polymer having the molecular weight; Mn, 9,294 grams/mole and Mw, 18,241 grams/mole.

EXAMPLE 14

Evaluation of the Poly(isopropenyl methacrylate) Crosslinker from Example 10 with the Polymer from Example 13

Figure 10:
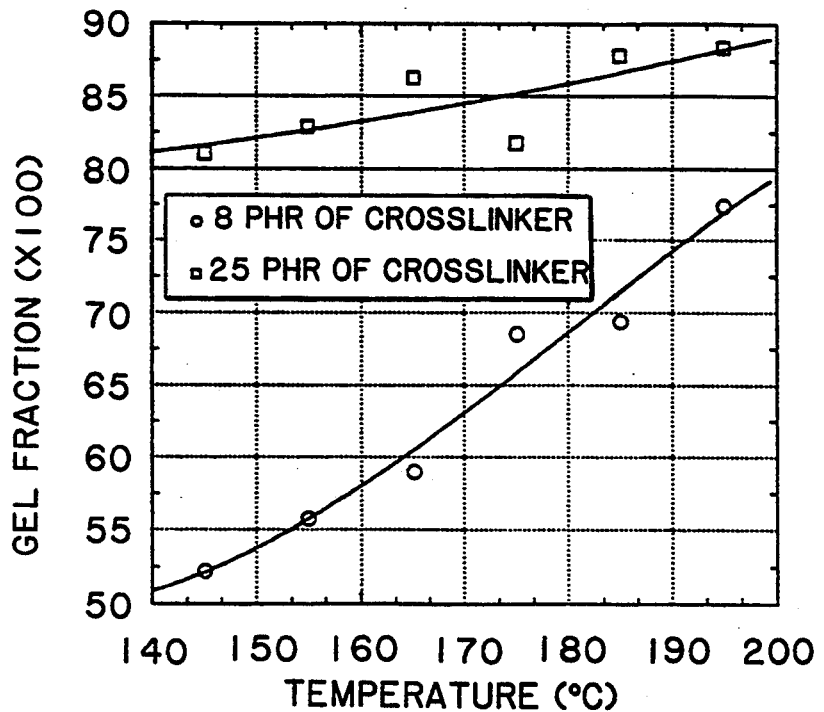
FIG. 10 shows crosslinking studies of the crosslinker from Example 10 below and the polymer from Example 13 below.

Formulations were prepared by adding 2.1 grams of the polymer solution from Example 13 to 8.0 grams of tetrahydrofuran. To each solvent-borne formulation was added dried crosslinker from Example 10 above and 3 parts per hundred of para-toluene sulfonic acid. The samples were cured in aluminum pans for 30 minutes in a forced-air oven. After the films were cured, 50 milligram of samples of the films were removed from the pans and were extracted for 18 hours using tetrahydrofuran. The extracted films were dried at 110° C. for one hour and then the gel fraction (X100) was calculated. The results are shown in the FIG. 10.

EXAMPLE 15

Preparation of a Poly(isopropenyl methacrylate) Crosslinker from a Monomer Solution of 75% Methyl Methacrylate and 25% Isopropenyl Methacrylate To a dried round-bottomed flask equipped with a stirrer, nitrogen purge and condenser were charged 53 grams of tetrahydrofuran solvent, 9.45 grams of methyl trimethyl silyl dimethyl ketene acetal as an initiator and 0.75 milliliter of a catalyst solution [0.1 mole of tri(dimethylamino) sulfur (trimethyl silyl) difluoride in acetonitrile]. The contents of the flask were cooled to 2° C. and then a monomer solution composed of 37.5 grams of methyl methacrylate and 12.5 grams of isopropenyl methacrylate was fed into the flask over 30 minutes while maintaining the temperature below 17° C. The contents of the flask were warmed to room temperature, 0.5 milliliters of the same catalyst solution was added and the contents of the flask stirred overnight at room temperature. Two grams of methanol were added to form a 50.3 weight percent polymer solution. The polymer was precipitated in water and then vacuum dried overnight at 75° C. and 2 millimeters of mercury pressure. The molecular weight of the resulting polymer was: Mn, 1,057 and Mw, 1,708.

EXAMPLE 16

Preparation of a Poly(isopropenyl methacrylate) Crosslinker from a Monomer Solution of 75% Methyl Methacrylate and 25% Isopropenyl Methacrylate To a dried round-bottomed flask equipped with a stirrer, nitrogen purge and condenser were charged 53 grams of tetrahydrofuran, 4.58 grams of methyl trimethyl silyl dimethyl ketene acetal as an initiator and 0.75 milliliters of a catalyst solution [0.1 mole of tri(-dimethylamino) sulfur (trimethyl silyl) difluoride in acetonitrile]. The contents of the flask were cooled to 2° C. and then a monomer solution composed of 37.5 grams of methyl methacrylate and 12.5 grams of isopropenyl methacrylate was fed into the flask over 26 minutes while maintaining the temperature below 16° C. The contents of the flask were warmed to room temperature and stirred overnight. To the reaction flask was then added 1.0 milliliters of more of the same catalyst solution and the contents of the flask stirred for 24 hours at room temperature. After 24 hours, 1.0 milliliters more of the catalyst solution was added and an exotherm was noted. Two hours after the second addition of the catalyst solution, another 1.0 milliliters of catalyst solution was added. No exotherm was observed. Two grams of methanol were added to the polymer solution to form a 52 weight percent solution. The polymer was precipitated in water and then vacuum dried overnight at 75° C. and 2 millimeters of mercury pressure. The molecular weight of the resulting polymer was; Mn 2,641 and Mw 4,571.

EXAMPLE 17

Preparation of a Poly(isopropenyl methacrylate) Crosslinker from a Monomer Solution of 75% Methyl Methacrylate and 25% Isopropenyl Methacrylate To a dried round-bottomed flask equipped with a stirrer, nitrogen purge, and condenser were charged 53 grams of tetrahydrofuran, 1.48 grams of methyl trimethylsilyl dimethyl ketene acetal as an initiator and 0.75 milliliters of a catalyst solution [0.1 mole of tri(dimethylamino) sulfur (trimethyl silyl) difluoride in acetonitrile]. The contents of the flask were cooled to 2° C. and then a monomer solution composed of 37.5 grams of methyl methacrylate and 12.5 grams of isopropenyl methacrylate was fed into the flask over 22 minutes while maintaining the temperature below 6° C. using an ice bath. The ice bath was removed and the contents of the flask were warmed to room temperature and stirred overnight. The solids content of the product was 41.2 weight percent. One gram of the same catalyst solution was added to the flask and the polymer solution stirred for 4 hours at room temperature to produce a 42.9 weight percent polymer solution. An additional 1.0 milliliters of the catalyst solution was added and the polymer solution stirred overnight. Two grams of methanol were added to the polymer solution to give a 45 weight percent polymer solution. The polymer was precipitated in water and then vacuum dried overnight at 60° C. and at 2 millimeters of mercury pressure. The molecular weight of the resulting polymer was: Mn 8,116 and Mw 13,960.

EXAMPLE 18

Preparation of a Poly(isopropenyl methacrylate) Crosslinker from a Monomer Solution of 75% Methyl Methacrylate and 25% Isopropenyl Methacrylate To a dried round-bottomed flask equipped with a stirrer, nitrogen purge, and condenser were charged 53 grams of tetrahydrofuran, 2.23 grams of methyl trimethyl silyl dimethyl ketene acetal as an initiator and 0.75 milliliter of a catalyst solution [0.1 mole of tri(dimethylamino) sulfur (trimethyl sily) difluoride in acetonitrile]. The contents of the flask were cooled to 12° C. and then a monomer solution composed of 37.5 grams of methyl methacrylate and 12.5 grams of isopropenyl methacrylate was fed into the flask over 40 minutes while maintaining the temperature below 16° C. The ice bath was removed and the contents of the flask were warmed to room temperature and stirred overnight to produce a solution containing 7.2 weight percent solids. One gram of the same catalyst solution was added to the flask and the polymer solution stirred for 1 hour. Then an additional 1.0 milliliter of the catalyst solution was added. After 55 minutes, another 1.0 milliliter of the catalyst solution was added and the polymer solution was stirred for 5 hours. Two grams of methanol were added to the polymer solution to produce a solution containing 49 weight percent solids. The polymer was precipitated in water and then vacuum dried at a pressure of 2 millimeters of mercury overnight at 60° C. The resulting polymer had a molecular weight of: Mn 5,602 and Mw 23,683.

EXAMPLE 19

Evaluation of the Poly(isopropenyl methacrylate) Crosslinkers from Examples 15 to 18 with the Polymer from Example 9

Formulations were prepared by adding 2.16 grams of the polymer solution from Example 9 above to 8.0 grams of 2-butanone. To each solvent-borne formulation was added 96 parts per hundred of crosslinker from Examples 15, 16, 17 or 18 above and 3 parts per hundred of para-toluene sulfonic acid as a catalyst. The samples were cured in aluminum pans for 15 and 30 minutes at the appropriate temperature in a forced-air oven to form films. After the films were cured, 50 milligram samples of the films were removed from the pans and were extracted for 18 hours using tetrahydrofuran. The extracted films were dried at 110° C. for one hour and then the gel fraction (X100) calculated. The results are shown in the Table 5.

TABLE 5

| Crosslinker of Example | Cure Times (min.) at 120° C. | Gel Fractions (×100) |
| --- | --- | --- |
| 15 | 15 | 66 |
| 15 | 30 | 67 |
| 16 | 15 | 76 |
| 16 | 30 | 80 |
| 17 | 15 | 87 |
| 17 | 30 | 90 |
| 18 | 15 | 85 |
| 18 | 30 | 89 |

EXAMPLE 20

Preparation of a Monodispersed Polymer Containing 22% Isopropenyl Methacrylate MMA/BMA/IPMA: 54.1/23.4/22.5

To a dried round-bottomed flask equipped with a stirrer, nitrogen purge, and condenser were charged 212 grams of tetrahydrofuran, 6.49 grams of methyl trimethyl sily dimethyl ketene acetal as an initiator and 2.5 milliliters of a catalyst solution [0.1 mole of tri(dimethylamino)sulfur (trimethyl sily) difluoride in acetonitrile]. The contents of the flask were cooled to 4° C. and then a monomer solution composed of 119.32 grams of methyl methacrylate, 51.52 grams of butyl methacrylate and 49.73 grams of isopropenyl methacrylate was fed into the flask over 55 minutes while maintaining the temperature below 11° C. The contents of the flask were stirred overnight at 5° C. and then 2.5 milliliters of additional catalyst solution added. Four hours after the second addition of catalyst solution, 25 milliliters of tetrahydrofuran and 1.2 grams of methanol were added to produce a solution containing 52 weight percent solids. The molecular weight of the polymer was; Mn 10,813 and Mw 12,455 and the Tg of the polymer was 73° C.

EXAMPLE 21

Evaluations of the Isopropenyl Methacrylate-Containing Polymer in Example 20

Solvent-borne formulations were prepared by adding 6.7 parts per hundred of propanediol and para-toluene sulfonic acid or 2.9 parts per hundred of tertiary-butyl peroxybenzoate (alone or with divinyl adipate) to the polymer solution from Example 20 above. The samples were cured in aluminum pans for 30 minutes in a forced-air oven to form films. After the films were cured, 50 milligram of samples of the films were removed from the pans and were extracted for 18 hours using tetrahydrofuran. The extracted films were dried at 110° C. for one hour and then the gel fraction (X100) calculated. The results are shown in the Table 6.

TABLE 6

| Crosslinker or Initiator | phr of Crosslinker or Initiator | phr of p-toluenesulfonic acid | phr of Divinyl Adipate | Cure Temperature (°C.) | Gel Fraction (×100) |
| --- | --- | --- | --- | --- | --- |
| Propanediol | 0.0 | 0.0 | 0.0 | 185 | 0.0 |
| Propanediol | 6.7 | 1.3 | 0.0 | 185 | 90 |
| Propanediol | 6.7 | 2.6 | 0.0 | 185 | 90 |
| t-butyl peroxybenzoate | 2.9 | 0.0 | 0.0 | 140 | 60 |
| t-butyl peroxybenzoate | 2.9 | 0.0 | 61.0 | 140 | 92 |

EXAMPLE 22

Evaluations of Styrene-Acrylic Polymer Crosslinked with Di-isopropenyl Adipate

Part A

This Example illustrates the crosslinking of a latex polymer without a volatile coalescing aid. A high-molecular weight styrene-acrylic water-borne polymer of 5 weight percent hydroxyethyl acrylate, 5 weight percent methacrylic acid, 45 weight percent ethyl acrylate and 45 weight percent styrene ("Polymer A") was formulated with various levels of di-isopropenyl adipate and 3 parts per hundred of p-toluene sulfonic acid (based on Polymer A). Polymer A was an emulsion polymer dispersed in water (45 weight percent Polymer A in water). To prepare a typical formulation, di-isopropenyl adipate and 3 part per hundred of p-toluene sulfonic acid were stirred into Polymer A. The formulation was stirred for at least 10 minutes before the films were evaluated. Then the samples of the formulation cured in aluminum pans at the appropriate temperature in a forced-air oven. After the films were cured, 50 milligram samples of the films were removed from the pans and were extracted for 18 hours using tetrahydrofuran (THF). The extracted films were dried at 110° C. for one hour and then the gel fraction (X100) was calculated. The results are shown in the Table 7.

TABLE 7

| Cure Temperature (°C.) | phr* of p-Toluene Sulfonic Acid | phr *of Isopropenyl Adipate | Gel Fraction (×100) |
| --- | --- | --- | --- |
| 80 | 0.0 | 0.0 | 4.7 |
| 80 | 3.0 | 3.0 | 5.3 |
| 80 | 3.0 | 4.86 | 10.2 |
| 80 | 3.0 | 6.0 | 7.8 |
| 120 | 0.0 | 0.0 | 8.0 |
| 120 | 3.0 | 3.0 | 77.5 |
| 120 | 3.0 | 4.86 | 79.6 |
| 120 | 3.0 | 6.0 | 78.6 |

*parts by weight per hundred parts by weight of Polymer A

Part B

To 50.0 grams of Polymer A (see Part A above) were charged 1.02 grams of di-isopropenyl adipate, 0.66 grams of p-toluene sulfonic acid and 9.61 grams of water. The formulation was stirred for at least 30 minutes.

Eight mils films (1.2 mil dry) were drawn down over Bonderite coated cold-rolled stainless steel test panels and then the films cured at the appropriate temperature for 30 minutes in a forced-air oven. After the films were cured, 50 milligram of samples of the films were removed from the panels and were extracted for 18 hours using THF. The extracted films were dried at 110° C. for one hour and then the gel fraction (X100)calculated. The results are shown in the Table 8. The films were very glossy.

TABLE 8

| Cure Temperature (°C.) | Methyl Ethyl Ketone Double Rubs |
| --- | --- |
| 80 | 50 |
| 100 | 54 |
| 120 | 120 |
| 140 | 200 |
| 160 | 300 |

EXAMPLE 23

Figure 6:
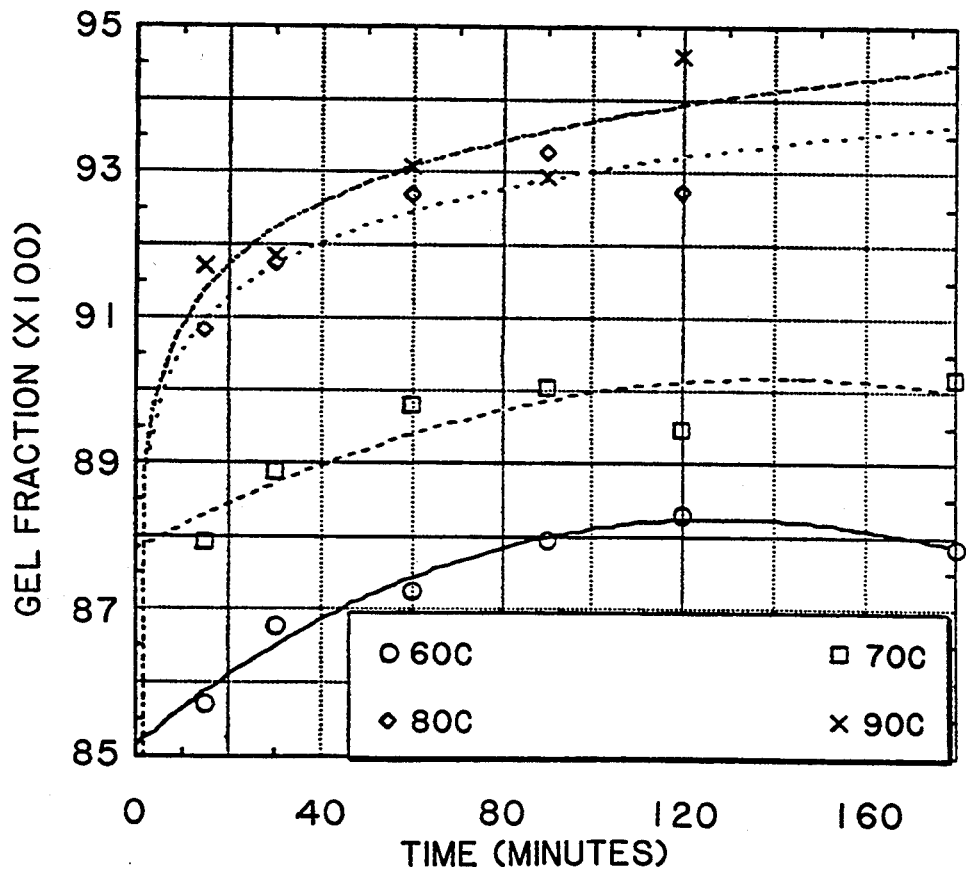
FIG. 6 shows gel fraction plots of the crosslinked hydroxyl-containing polymer of Example 5 below using di-isopropenyl adipate as the crosslinker.

Evaluation of the Di-isopropenyl Adipate with a Polymer Formulation Using Acetone as the Solvent Ten grams of the polymer solution from Example 5 above was vacuum dried overnight at 80° C. and then for 2 hours at 140° C. to remove the PM Acetate. The dried polymer (4.21 grams) was redissolved in acetone (4.21 grams). Formulations were prepared by adding 4.0 grams of the acetone polymer solution to an additional 16.0 grams of acetone. To each solvent-borne formulation was added 0.434 grams of di-isopropenyl adipate and 3 parts per hundred of para-toluene sulfonic acid. The samples of the formulations were cured in aluminum pans for various lengths of time in a forced-air oven. After the films were cured, 50 milligram of samples of the films were removed from the pans and were extracted for 18 hours using tetrahydrofuran. The extracted films were dried at 110° C. for one hour, and then the gel fraction (X100)calculated. Results are shown in FIG. 6 that

EXAMPLE 24

Hydroxyl-Containing Vinyl Halide Polymer Crosslinked With Diisopropenyl Adipate Using P-Toluene Sulfonic Acid Catalyst Polymer B is a terpolymer of vinyl chloride, vinyl acetate and hydroxy propyl acrylate. Polymer B had an hydroxyl equivalent weight is 600 and had about 9.3 hydroxyls per molecule. The formulations tested contained one mole of vinyl (from DVP) to one mole of hydroxyl from Polymer B. The following formulations containing Polymer B were prepared, cured and tested as shown below.

| FORMULATION | 1 | 2 | 3 | 4 | 5 |
| --- | --- | --- | --- | --- | --- |
|  | PARTS BY WEIGHT | | | | |
| Polymer B | 60 | 60 | 60 | 60 | 60 |
| Methyl Isobutyl Ketone (MIBK) | 60 | 60 | 60 | 60 | 60 |
| Divinyl Adipate (DVP) | 9.9 | 9.9 | 9.9 | 9.9 | 9.9 |
| Methane Sulfonic Acid | 0 | 0.7 | 1.4 | 2.1 | 2.8 |
| CURE CONDITIONS | No. of MEK RUBS ON CAST FILMS | | | | |
| 1-Hour/73° F. | 4 | 5 | 7 | 10 | 12 |
| 24-Hours/73° F. | 7 | 7 | 10 | 18 | 18 |
| 30 Min/140° F. | 12 | 13 | 17 | 18 | 18 |
| SOLUTION CONDITION AFTER 24-HOURS AT RT | FLUID | FLUID | VISCOUS | VISCOUS | GEL |
| CURED FILM CONDITION | SOFT | SOFT | SOFT | SOFT | SOFT |

PROCEDURE: Polymer B was dissolved in MIBK. Divinyl adipate was stirred in followed by the catalyst. Solutions were cast on Leneta paper in 1-mil dry films. The MEK rub test was used to evaluate degree of crosslinking.

CONCLUSIONS: Divinyl adipate crosslinked Polymer B but only to a slight extent under the cure conditions tested. Crosslink density as measured by MEK rubs increased with increasing acid catalyst concentration, but was low under all conditions tested. In this experiment divinyl adipate shows low reactivity relative to typical urea or melamine formaldehyde crosslinkers. However, no formaldehyde is liberated when divinyl adipate is used.

EXAMPLE 25

Evaluation of Di-Isopropenyl Adipate with a Polyester Polymer

A formulation was formed containing 20.00 grams di-isopropenyl adipate, 10.65 grams Desmophen 651A-65 TM and 0.6 gram Nacure ® 2500. Desmophen 651A-65 TM is hydroxy-functional polyester polymer from Miles Laboratories. Panels were cured in the oven at 140° C. for 15 minutes, 1 hour and 4 hours. Di-isopropenyl adipate and the polyester polymer were not miscible upon mixing (an emulsion formed).

| Panel | Time | Temp (°C.) | MEK Rubs |
| --- | --- | --- | --- |
| 1 | 15 min | 140 | >200 |
| 2 | 1 hour | 140 | 307 |

-continued

| Panel | Time | Temp (°C.) | MEK Rubs |
|---|---|---|---|
| 3 | 4 hours | 140 | >400 |

Panel 3 changes colour from clear to yellow-brown after 4 hours in the oven.

What is claimed is:

1. A process for crosslinking a polymer containing hydroxyl groups which process comprises:
   (a) forming a mixture of said polymer and crosslinking amount of a poly(alpha, beta-alkenylcarboxylate) that is free of isocyanato groups and groups that cause liberation of formaldehyde during the cure of the polymer containing hydroxyl groups, and
   (b) maintaining the mixture in the presence of a low molecular weight solvent and catalyst, at elevated temperature conditions under which the polymer cures by reaction of the hydroxyl groups of the polymer with the poly(alpha, beta-alkenylcarboxylate), to produce a crosslinked polymer and an aldehyde or ketone by product derived from the alkenyl groups of the poly(alpha, beta-alkenylcarboxylate).

2. A process as claimed in claim 1 wherein the poly-(alpha,beta-alkenylcarboxylate is selected from the group consisting of:
di-isopropenyl adipate,
bis-[1-butadien-2-yl]maleate,
di-isopropenyl-terephthalate,
bis[1-phenyl-vinyl]itaconate,
di-isopropenyl 1,4-cyclohexanedicarboxylate,
tris(2-propenyl) 1,3,5-benzenetricarboxylate,
isopropenyl trans-1propenyl adipate,
acrylic polymers containing pendant alpha,beta-alkenylcarboxylate groups and
melamine-poly(alpha,beta-alkenylcarboxylate reaction product containing pendant alpha,beta-alkenylcarboxylate groups.

3. A process as claimed in claim 1 wherein the catalyst is an amine-blocked sulfonic acid crosslinking catalyst.

4. A process as claimed in claim 1 wherein the polymer containing hydroxyl groups is an organic solvent-soluble acrylic polymer containing hydroxyl groups or a latex polymer containing hydroxyl groups.

5. A process as claimed in claim 1 wherein the poly (alpha,beta-alkenylcarboxylate) is a homopolymer or a copolymer of isopropenyl methacrylate or isopropenyl acrylate.

6. A process in claim 1 wherein the poly(alpha,beta-alkenylcarboxylate) is a copolymer of isopropenyl methacrylate or isopropenyl acrylate, and at least one member selected from a group consisting of methacrylate, methyl methacrylate and hydroxyethyl methacrylate.

7. A process as claimed in claim 1 wherein the polymer containing hydroxyl groups is an emulsion polymer dispersed in water and wherein the process is conducted in the absence of a coalescing aid.

* * * * *